(12) United States Patent
Vannebo et al.

(10) Patent No.: US 11,367,332 B2
(45) Date of Patent: Jun. 21, 2022

(54) HAZARD DETECTOR SOCKET

(71) Applicant: Autronica Fire & Security AS, Trondheim (NO)

(72) Inventors: Per Johan Vannebo, Trondheim (NO); Hans Jorgen Svendsen, Trondheim (NO); Ole Martin Pedersen, Trondheim (NO)

(73) Assignee: AUTRONICA FIRE & SECURITY AS, Trondheim (NO)

( * ) Notice: Subject to any disclaimer, the term of this patent is extended or adjusted under 35 U.S.C. 154(b) by 0 days.

(21) Appl. No.: 17/056,627

(22) PCT Filed: May 29, 2018

(86) PCT No.: PCT/EP2018/064110
§ 371 (c)(1),
(2) Date: Nov. 18, 2020

(87) PCT Pub. No.: WO2019/228615
PCT Pub. Date: Dec. 5, 2019

(65) Prior Publication Data
US 2021/0209913 A1 Jul. 8, 2021

(51) Int. Cl.
| | |
|---|---|
| G08B 17/00 | (2006.01) |
| G06F 1/28 | (2006.01) |
| G08B 7/06 | (2006.01) |
| G08B 25/00 | (2006.01) |
| G08B 25/04 | (2006.01) |

(52) U.S. Cl.
CPC .............. *G08B 17/00* (2013.01); *G06F 1/28* (2013.01); *G08B 7/06* (2013.01); *G08B 25/009* (2013.01); *G08B 25/04* (2013.01)

(58) Field of Classification Search
CPC ......... G06F 1/28; G08B 17/00; G08B 25/009; G08B 25/04; G08B 1/08; G01S 1/68; G01S 1/0426; H04Q 9/00
See application file for complete search history.

(56) References Cited

U.S. PATENT DOCUMENTS

| | | |
|---|---|---|
| 3,799,670 A | 3/1974 | Kohr |
| 6,859,146 B2 | 2/2005 | McGreal et al. |
| 9,002,525 B2 | 4/2015 | Gourlay et al. |
| 9,007,224 B1 | 4/2015 | Fadell et al. |
| 9,390,605 B2 | 7/2016 | Schmid |

(Continued)

FOREIGN PATENT DOCUMENTS

| | | |
|---|---|---|
| CN | 100383825 C | 4/2008 |
| CN | 201549046 U | 8/2010 |

(Continued)

OTHER PUBLICATIONS

ISR/WO for Application No. PCT/EP2018/064110; dated Feb. 15, 2019; 13 pages.

*Primary Examiner* — Mirza F Alam
(74) *Attorney, Agent, or Firm* — Cantor Colburn LLP

(57) ABSTRACT

Disclosed is a socket for removably connecting a hazard detector to a networked alarm system, the system having a first controller which is a system controller, the socket having: a housing having a base, an electrical interface for removably receiving the detector, and a second controller which is a socket controller mounted to the base, the socket controller maintaining wireless and/or wired network communications with the system controller when the detector is connected and disconnected.

14 Claims, 3 Drawing Sheets

(56) References Cited

U.S. PATENT DOCUMENTS

| | | | |
|---|---|---|---|
| 9,501,925 B2 | 11/2016 | Stagg | |
| 2007/0109140 A1 | 5/2007 | Nicks et al. | |
| 2007/0146127 A1* | 6/2007 | Stilp | G08B 1/08 |
| | | | 340/531 |
| 2012/0171987 A1 | 7/2012 | Newman | |
| 2014/0062693 A1* | 3/2014 | Watts | G08B 25/08 |
| | | | 340/539.11 |
| 2015/0097689 A1* | 4/2015 | Logue | H04W 4/38 |
| | | | 340/632 |
| 2016/0225243 A1 | 4/2016 | Albass et al. | |
| 2017/0228993 A1* | 8/2017 | Avak | H04W 52/50 |
| 2017/0337793 A1 | 11/2017 | Klug | |
| 2019/0139397 A1* | 5/2019 | Ziems | G08C 17/02 |

FOREIGN PATENT DOCUMENTS

| | | |
|---|---|---|
| CN | 103474842 A | 12/2013 |
| CN | 204029093 U | 12/2014 |
| CN | 205158572 U | 4/2016 |
| CN | 107229263 A | 10/2017 |
| CN | 107293889 A | 10/2017 |
| CN | 206976726 U | 2/2018 |
| EP | 0567820 B1 | 6/1997 |
| EP | 1889238 B1 | 8/2009 |
| EP | 2554855 A2 | 2/2013 |
| EP | 2983145 A1 | 2/2016 |
| EP | 3032511 A1 | 6/2016 |
| GB | 2055236 A | 2/1981 |
| GB | 2281139 B | 12/1996 |
| KR | 20170125664 A | 11/2017 |
| WO | 2017029562 A1 | 2/2017 |

* cited by examiner

HAZARD DETECTOR SOCKET

CROSS REFERENCE TO RELATED APPLICATIONS

This is a US National Stage of Application No. PCT/EP2018/064110, filed on May 29, 2018, the disclosure of which is incorporated herein by reference.

BACKGROUND

Exemplary embodiments pertain to the art of hazard detectors and more specifically to a hazard detector socket.

An industrial smoke detector unit may consist of a detector socket to be mounted on a surface such as a ceiling and a detector that plugs into this socket. In a redundancy loop of such smoke detectors all electronics may be inside the detector.

When installing a loop based fire alarm system, the electrician traditionally mounts cabling and detector sockets, then insert detectors, and at this time the technician may identify what detector sits where. A technician may not be able to verify the electrical integrity of the loop before all loop units are in place unless the loop includes certain no-break sockets. A no-break socket is one in which a detector loop may not be broken when removing a smoke detector (i.e., for replacing, cleaning etc.). No-break sockets may use a micro switch that closes the detector loop when removing the detector to prevent losing fire detection or introducing a break in redundancy electronics when removing a detector. For example such micro switches connect the inputs and output from the opened socket.

BRIEF DESCRIPTION

Disclosed is a socket for removably connecting a hazard detector to a networked alarm system, the system having a first controller which is a system controller, the socket comprising: a housing having a base, an electrical interface for removably receiving the detector, and a second controller which is a socket controller mounted to the base, the socket controller maintaining wireless and/or wired network communications with the system controller when the detector is connected and disconnected.

In addition to one or more of the above disclosed features or as an alternate the socket includes a first plurality of electrical connectors mounted to the base for electrically connecting to the system and receiving power and data from the system whether the detector is connected or disconnected In addition to one or more of the above disclosed features or as an alternate the electrical interface is a communications port for connecting to a data transfer port in the detector.

In addition to one or more of the above disclosed features or as an alternate wherein the socket includes a second plurality of electrical connectors for connecting the socket within a daisy-chain of hazard detectors disposed on a common circuit the system.

In addition to one or more of the above disclosed features or as an alternate wherein the socket includes a third plurality of electrical connectors for powering an indicator which is a visual and/or audio indicator.

In addition to one or more of the above disclosed features or as an alternate the socket controller actuates the indicator when a connected detector is in an alarm state.

Further disclosed is a networked alarm system comprising: a system controller, a circuit and at least one detector mounted to the circuit with the socket having one or more of the above disclosed features.

In addition to one or more of the above disclosed features or as an alternate the socket receives power and data over the circuit.

In addition to one or more of the above disclosed features or as an alternate the circuit is a loop circuit.

In addition to one or more of the above disclosed features or as an alternate the socket controller determines when a detector is disconnected therefrom and communicates a status update to the system controller, wherein the system controller communicates the status update to a third controller over a telecommunications network, and wherein the third controller is a fire system controller.

Further disclosed is a method for removably connecting a hazard detector to a networked alarm system, the system having a first controller which is a system controller, the method comprising: removably connecting the hazard detector to a socket having one or more of the above disclosed features. Further disclosed is a method of configuring the networked alarm system, the system including one or more of the above disclosed features.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
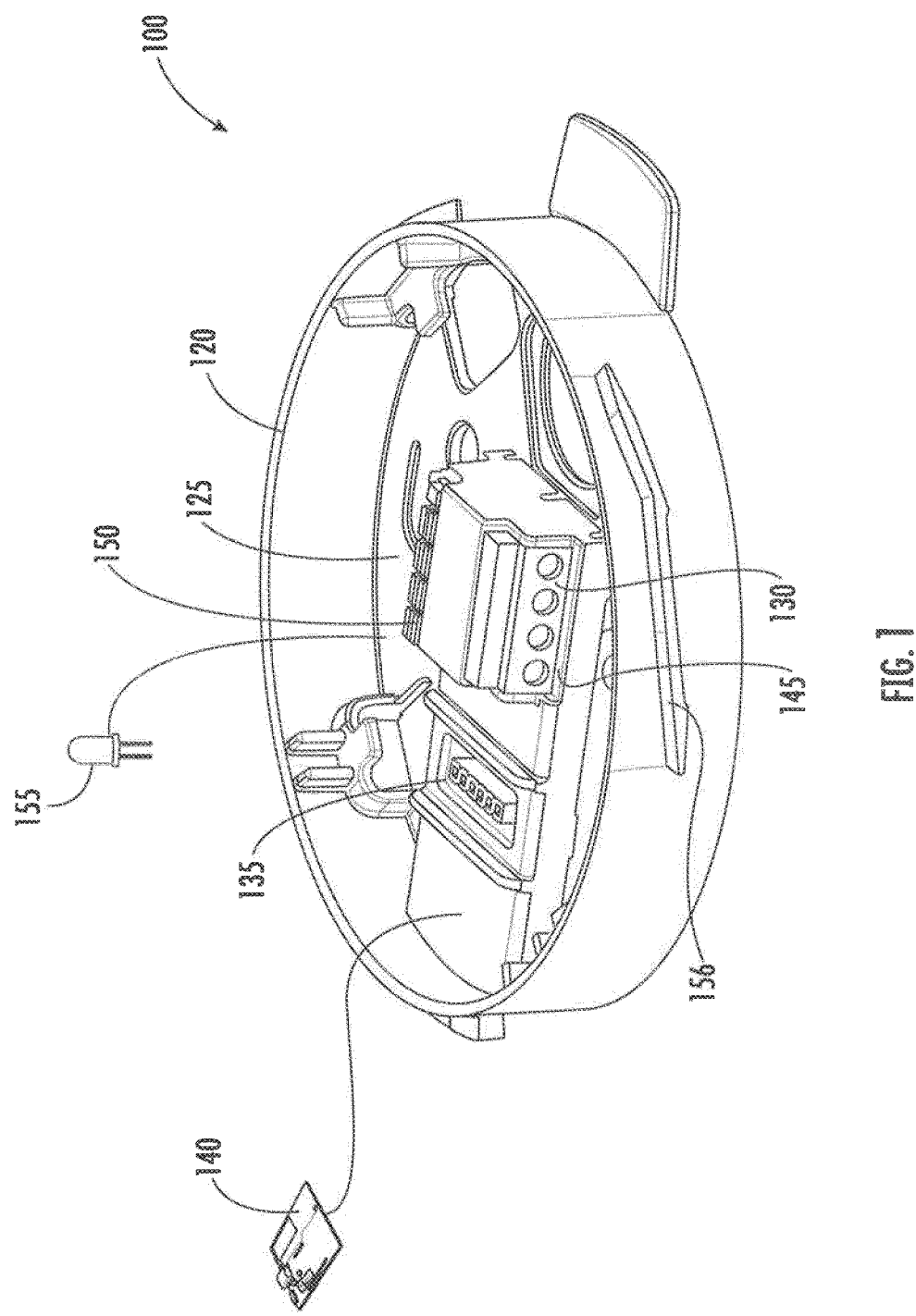
FIG. 1 illustrates an alarm socket according to an embodiment.
Figure 2:
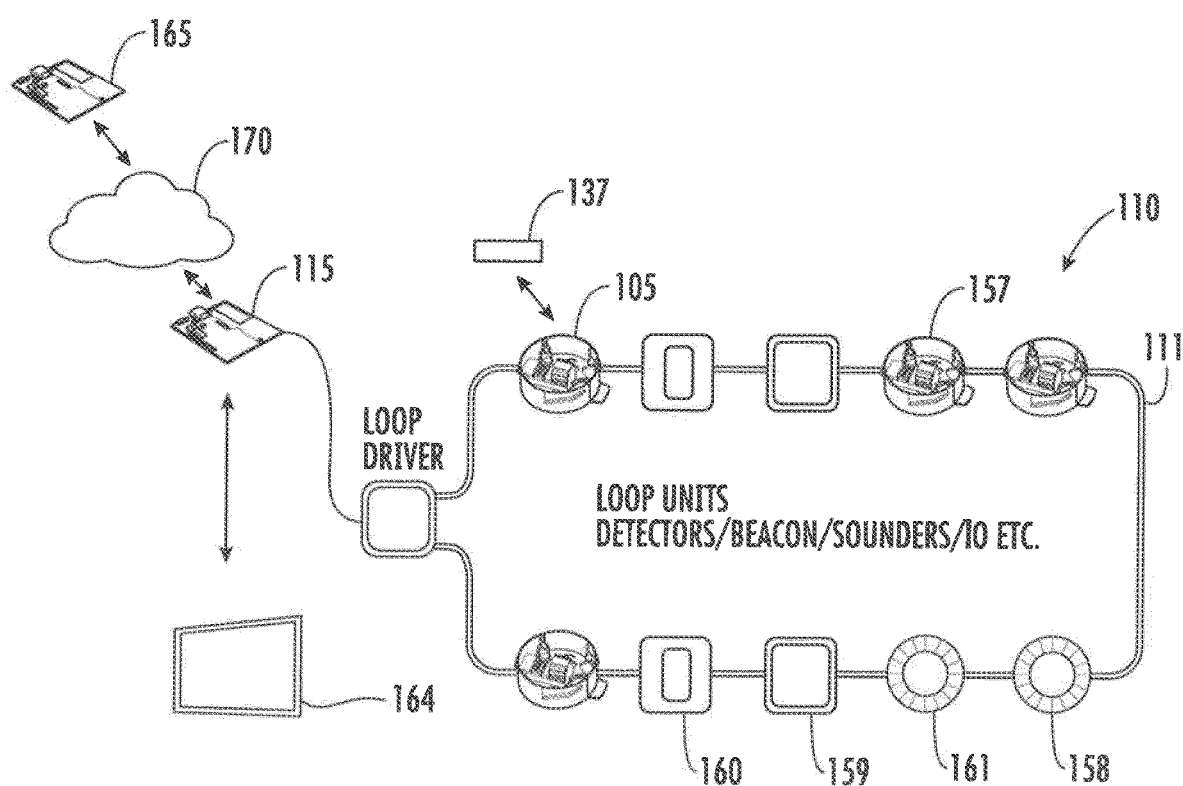
FIG. 2 illustrates a networked alarm system according to an embodiment.

Turning to FIGS. 1 and 2, disclosed is a socket 100 for removably connecting a hazard detector 105 (which in this type of configuration may be referred to as a head unit) to a networked alarm system 110. The system 110 may be a looped circuit 111 with a plurality of daisy-chained detectors including the hazard detector 105. The hazard detector 105 may be a smoke detector, beacon, sounder, an input/output device, etc. In the illustrated embodiment the detector 105 is a smoke detector. The system 110 may be an intelligent alarm system which has a first controller 115 which is a system controller.

With further reference to FIG. 1, the socket 100 may comprise a housing 120 having a base 125. The housing may be generally cylindrical and the base may be attachable to a ceiling. A first plurality of electrical connectors 130 may be mounted to the base 125. The connectors 130 may be used for electrically connecting the socket to the system 110 to receive power. Within the scope of the disclosure are wireless and wired network connections for connecting the socket 100 to the system 110.

With the connectors 130, the socket 100 may continuously receive available power from the networked alarm system 110 when the detector 105 is connected and disconnected. By preventing a break in the system 110, the socket 100 secures the continued use of the redundant power lines in the loop.

An electrical interface 135 may be provided for removably receiving the detector 105. In addition a second controller 140 which may be a socket controller is mounted to the base 125. The socket controller 140 may maintain wired or wireless communications with the system controller 115 when the hazard detector 105 is connected and disconnected. As a result, intelligent communications with the socket 100 may occur in the absence of the detector.

The electrical interface 135 may be a communication port or more specifically a serial port for connecting to a data transfer port 137 in the detector 105. Such standardized port connections may enable relatively quick interchanging of detectors for example to update or to change the type of detector or communication electronics within the socket 100. It is within the scope of the disclosure to use a smoke detector, a heat detector, or other hazard detector with the socket 100.

A second plurality of electrical connectors 145 may be provided for connecting the socket 100 to the circuit 111 to provide power to additional detectors in the daisy-chain. A third plurality of electrical connectors 150 are included for powering an indicator 155 which is a visual and/or audio indicator 155. The socket controller 140 actuates the indicator 155 when a connected detector 105 is in an alarm state. The indicator 155 may be a light emitting diode (LED).

Other features of the disclosed embodiments may include that the housing 120 has one or more mechanical connectors 156 for fixedly receiving the detector 105. The mechanical connectors 156 may be flanges, protrusions, tabs or the like.

Turning to FIG. 2 the circuit 111 may, at one time or another be in a configuration where various sockets such as sockets 105, 157, etc., are not fitted with a head unit. At the same time, other head units may be installed in one or more sockets of the type disclosed herein such as with detector 158, sounder 159 and beacon 160. (As indicated head units including input/output devices, etc. are within the scope of the disclosure.) Yet additionally, a legacy style hazard detector 161 may also be in the circuit 111. Advantageously with the configuration of FIG. 2, uninterrupted power and data may be communicated throughout the circuit 111, to each socket of the type disclosed herein, each head unit attached to such socket, and each legacy type hazard detector.

As further illustrated in FIG. 2, other features of the disclosed system 110 may include a fire alarm panel 164 that includes the system controller 115. The socket controller 140 may determine when a detector 105 is disconnected therefrom and communicate a status update to the system controller 115. The system controller 115 may communicate the status update to a third controller 165 over a telecommunications network 170. The third controller 165 may be a fire system controller 165 such as at a remote monitoring station.

The above disclosed system 100 separates field communication from the detector/sounder/beacon connected to the socket. One advantage of this configuration may be implementing at a later stage a new field communication protocol, and reusing the detector/sounder/beacon. The socket may be adapted for other existing field protocols, including wired and wireless protocols. Beneficially any detector/sounder/beacon, and regulatory certifications associated with the same, may be reused.

Figure 3:
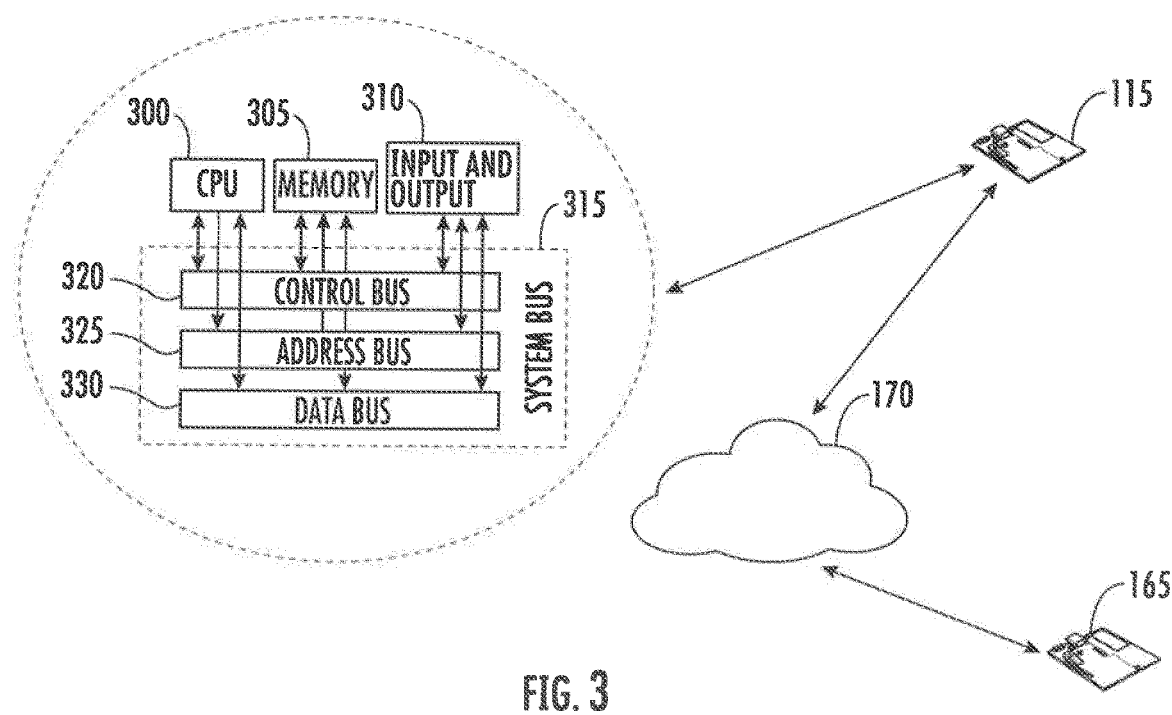
FIG. 3 illustrates various electronic features utilized in electronic controllers according to an embodiment.

Turning now to FIG. 3, and as indicated above, the embodiments herein may include a plurality of controllers including the first controller 115, the second controller 140 and the third controller 165, wherein at least the first controller 115 and third controller 165 communicate over the network 170. The plurality of controllers may have substantially the same technology features. Accordingly, features of the plurality of controllers may be disclosed hereinafter with reference to the first controller 115, which may be generally referred to hereinafter as controller 115.

The controller 115 may be a computing device that includes processing circuitry that may further include an application specific integrated circuit (ASIC), an electronic circuit with one or more elemental circuit components such as resistors, an electronic processor (shared, dedicated, or group) 300 and memory 305 that executes one or more software algorithms or firmware algorithms and programs, contains relevant data which may be dynamically collected or disposed in one or more look-up tables, a combinational logic circuit that contains one or more operational amplifiers, and/or other suitable interfaces and components that provide the described functionality. For example, the processor 300 processes data stored in the memory 305 and employs the data in various control algorithms, diagnostics and the like.

The controller 115 may further include, in addition to a processor 300 and memory 305, one or more input and/or output (I/O) device interface(s) 310 that are communicatively coupled via an onboard (local) interface to communicate among the plurality of controllers. The onboard interface may include, for example but not limited to, an onboard system bus 315, including a control bus 320 (for inter-device communications), an address bus 325 (for physical addressing) and a data bus 330 (for transferring data). That is, the system bus 315 enables the electronic communications between the processor 300, memory 305 and I/O connections 310. The I/O connections 310 may also include wired connections and/or wireless connections. The onboard interface may have additional elements, which are omitted for simplicity, such as controllers, buffers (caches), drivers, repeaters, and receivers to enable electronic communications.

In operation, the processor 300 onboard the controller 115 may be configured to execute software algorithms stored within the memory 305, to communicate data to and from the memory 305, and to generally control computing operations pursuant to the software algorithms. The algorithms in the memory 305, in whole or in part, may be read by the processor 300, perhaps buffered within the processor 300, and then executed. The processor 300 may include hardware devices for executing the algorithms, particularly algorithms stored in memory 305. The processor 300 may be a custom made or a commercially available processor 300, a central processing units (CPU), an auxiliary processor among several processors associated with computing devices, semiconductor based microprocessors (in the form of microchips or chip sets), or generally any such devices for executing software algorithms.

The memory 305 onboard the controller 115 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 305 may incorporate electronic, magnetic, optical, and/or other types of storage media. The memory 305 may also have a distributed architecture, where various components are situated remotely from one another, but may be accessed by the processor 300.

The software algorithms in the memory 305 onboard the controller 115 may include one or more separate programs, each of which includes an ordered listing of executable instructions for implementing logical functions. A system component embodied as software algorithms may be construed as a source program, executable program (object code), script, or any other entity comprising a set of instructions to be performed. When constructed as a source program, the software algorithms may be translated via a compiler, assembler, interpreter, or the like, which may or may not be included within the memory.

Some of the input/output (I/O) devices that may be coupled to the controller 115 using the system I/O Interface(s) 310, the wired interfaces and/or the wireless interfaces will now be identified but the illustration of which shall be omitted for brevity. Such I/O devices include, but are not limited to (i) input devices such as a keyboard, mouse, scanner, microphone, camera, proximity device, etc., (ii) output devices such as a printer, display, etc., and (iii) devices that communicate both as inputs and outputs, such as a modulator/demodulator (modem; for accessing another device, system, or network), a radio frequency (RF) or other transceiver, a telephonic interface, a bridge, a router, etc.

Further, using the wireless connection, the controller 115 may communicate over the network 170 by applying electronic short range communication (SRC) protocols. Such protocols may include local area network (LAN) protocols and/or a private area network (PAN) protocols. LAN protocols include Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Such wireless connection 330 may include Radio-frequency identification (RFID) technology, which is another SRC technology used for communicating with an integrated chip (IC) on an RFID smartcard.

One should note that the above disclosed architecture, functionality, and/or hardware operations of the controller 115 may be implemented using software algorithms. In the software algorithms, such functionality may be represented as a module, segment, or portion of code, which comprises one or more executable instructions for implementing the specified logical function(s). It should also be noted that such modules may not necessarily be executed in any particular order and/or executed at all.

One should also note that any of the functionality of the controller 115 described herein can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device.

Further, the computer readable medium in the controller 115 may include various forms of computer readable memory 305. For example the computer readable memory 305 may be integral to an apparatus or device, which may include one or more semiconductors, and in which the communication and/or storage technology may be one or more of electronic, magnetic, optical, electromagnetic or infrared. More specific examples (a non-exhaustive list) of a computer-readable medium the illustration of which being omitted for brevity include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

In addition, the above distributed system of controllers is not intended to be limiting. In one embodiment, each of the controllers on the same side of the network may be the same device such that no network there between is required. In one embodiment a single on-site controller is provided instead of the distributed system of controllers. In one embodiment the controllers on the same side of the network are controlled by servers located over the World Wide Web, using a cloud computing configuration. In one embodiment, the distributed controller network is hard-wired for all telecommunication services so that no wireless network is necessary. In one embodiment redundant wireless and wired networks are utilized which automatically switch between such services to minimize network congestion.

The above configuration provides placing all loop communication electronics in the socket, including short circuit isolators, voltage regulators etc. A communication bus in the detector connects the detector to the socket via a connector interface in the socket. The communication bus in the detector may be standardized so that the detector may be used with many different socket versions and the socket may receive different types of detectors. The disclosed embodiments enable the use of remote service tools (IR, led flashing, RFID etc.) on the socket. Thus the disclosed embodiments enable a technician to electrically connect the socket to obtain to complete loop electronics before detector is mounted.

Changing communications technologies (new technology, improvements) may be more easily implemented with independent detectors. The disclosed sockets may enable advanced loop diagnostics without mounting detectors (that is, before commissioning the loop or individual detectors). The disclosed sockets may provide universal connections to other loop units, sounders, strobes, I/O-modules, etc. Changing detectors at the end of a useful life cycle may be more efficient due to reusing communication modules.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A networked alarm system comprising:
a socket for removably connecting a hazard detector to a networked alarm system, the system having a first controller which is a system controller,
a loop circuit operationally connected to the system controller, and the hazard detector mounted to the circuit with the socket,
the socket comprising:
a housing having a base,
an electrical interface for removably receiving the detector, and
a second controller which is a socket controller mounted to the base, the socket controller maintaining wireless and/or wired network communications with the system controller when the detector is connected and disconnected,
wherein:
the socket controller is configured to determine when a detector is disconnected therefrom, and no head unit is fitted thereto, and communicates a status update to the system controller,
the system controller is configured to communicate the status update to a third controller over a telecommunications network when no head unit is fitted thereto, and the third controller being a fire system controller; and
the system includes a plurality of the sockets in the loop, at least one socket is without a head unit and other ones of the sockets have different styles of hazard detectors.

2. The system of claim 1 comprising
a first plurality of electrical connectors disposed in the socket and mounted to the base for electrically connecting to the system and receiving power and data from the system whether the detector is connected or disconnected.

3. The system of claim 1, wherein
the electrical interface is a communications port for connecting to a data transfer port in the detector.

4. The system of claim 1, including
a second plurality of electrical connectors disposed in the socket for connecting the socket within a daisy-chain of hazard detectors disposed on a common circuit the system.

5. The system of claim 1, comprising
a third plurality of electrical connectors in the socket for powering an indicator which is a visual and/or audio indicator.

6. The system of claim 1, wherein
the socket controller is configured to actuates the indicator when a connected detector is in an alarm state.

7. The system of claim 1 wherein the socket receives power and data over the circuit.

8. A method for configuring a networked alarm system, the system having a first controller which is a system controller, and a loop circuit operationally connected to the system controller,
the method comprising:
removably connecting a hazard detector to a socket, wherein the socket includes:
a housing having a base,
an electrical interface for removably receiving the detector, and
a second controller which is a socket controller mounted to the base, the socket controller maintaining wireless and/or wired network communications with the system controller when the detector is connected and disconnected, and
wherein
the socket controller determines when a detector is disconnected therefrom, and no head unit is fitted thereto, and communicates a status update to the system controller,
the system controller communicates the status update to a third controller over a telecommunications network, the third controller being a fire system controller, and
the system includes a plurality of the sockets in the loop, at least one socket is without a head unit and other ones of the sockets have different styles of hazard detectors.

9. The method of claim 8, wherein
the socket includes a first plurality of electrical connectors mounted to the base for electrically connecting to the system and receiving power and data from the system whether the detector is connected or disconnected.

10. The method of claim 8, wherein
the electrical interface is a communications port for connecting to a data transfer port in the detector.

11. The method of claim 8, wherein
the socket include a second plurality of electrical connectors for connecting the socket within a daisy-chain of hazard detectors disposed on a common circuit the system.

12. The method of claim 8, wherein
the socket comprises a third plurality of electrical connectors for powering an indicator which is a visual and/or audio indicator.

13. The method of claim 8, wherein
the socket controller actuates the indicator when a connected detector is in an alarm state.

14. The method of claim 8, wherein
the socket receives power and data over the circuit.

* * * * *